(12) United States Patent
Tamura (10) Patent No.: US 7,784,509 B2
(45) Date of Patent: Aug. 31, 2010

(54) PNEUMATIC TIRE

(75) Inventor: Masahiro Tamura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 988 days.

(21) Appl. No.: 11/417,030

(22) Filed: May 4, 2006

(65) Prior Publication Data

US 2006/0254684 A1    Nov. 16, 2006

(30) Foreign Application Priority Data

May 13, 2005    (JP)    ............................. 2005-141528

(51) Int. Cl.
*B60C 11/03* (2006.01)
(52) U.S. Cl. .............................. 152/209.18; 152/209.22
(58) Field of Classification Search ............ 152/209.18, 152/209.22
See application file for complete search history.

(56) References Cited

U.S. PATENT DOCUMENTS 3,498,354 A * 3/1970 Boileau .................. 152/209.18

6,192,953 B1    2/2001  Fukumoto
2002/0139460 A1 * 10/2002 Boiocchi et al. ......... 152/209.2
2006/0137791 A1 *  6/2006 Miyabe et al. ......... 152/209.18

FOREIGN PATENT DOCUMENTS

| DE | 8708747     | * 10/1987 |
| JP | 05-169922   | *  7/1993 |
| JP |   654365    | *  5/1995 |
| JP | 2001-347811 A |  12/2001 |
| JP | 2002-262312 | *  9/2004 |

* cited by examiner

*Primary Examiner*—Steven D Maki
(74) *Attorney, Agent, or Firm*—Birch, Stewart, Kolasch & Birch, LLP (57) ABSTRACT

A pneumatic tire comprises a tread portion provided with axial grooves opened at a tread edge and a circumferential groove adjacent to the tread edge, wherein each of the axial grooves is provided between the circumferential groove and tread edge with a thin partition wall to prevent noise sound emission without deteriorating wet performance.

4 Claims, 6 Drawing Sheets

PNEUMATIC TIRE

The present invention relates to a pneumatic tire, more particularly to a tread groove arrangement capable of improving noise performance and wet performance.

In general, a pneumatic tire is provided in the tread portion with tread grooves. When a circumferential groove is disposed near the tread edge, lateral grooves extending from the circumferential groove to the tread edge are often disposed with intent to discharge water in the circumferential groove through the axial grooves.

In dry conditions, however, in a tube-like part formed between the circumferential groove and the road surface when in the ground contact patch of the tire during running, the air in the tube-like part is compressed and jets out into the axial grooves, and the jet-out sound leaks through the axial grooves and heard as pumping noise or so called pitch noise. Further, when the circumferential groove is a straight wide groove, the air in the tube-like part resonates and the resonance sound leaks through the axial grooves.

These types of noise can be reduced by decreasing the width of the circumferential groove, but deterioration of wet performance is inevitable.

It is therefore, an object of the present invention to provide a pneumatic tire, in which noise performance and wet performance can be improved in a well balanced manner.

According to the present invention, a pneumatic tire comprises a tread portion provided with axial grooves opened at a tread edge and a circumferential groove adjacent to the tread edge, wherein each of the axial grooves is provided between the circumferential groove and tread edge with a thin partition wall.

Therefore, the partition wall hinders the compressed air in the shoulder circumferential groove from being discharged through the shoulder axial grooves to the tread edge.

But surprisingly, by making the partition wall very thin, the deterioration of the wet performance can be minimized or almost prevented.

Embodiments of the present invention will now be described in detail in conjunction with the accompanying drawings.

The present invention can be applied to various pneumatic tires for passenger cars, heavy-duty vehicles (trucks and buses), motorcycles and the like.

As well known in the tire art, a pneumatic tire comprises a tread portion 2 with tread edges E, a pair of axially spaced bead portions each with a bead core therein, a pair of sidewall portions extending between the tread edges E and bead portions, a carcass extending between the bead portions and secured to the bead cores, a tread reinforcing belt disposed in the tread portion and radially outside the crown portion of the carcass. The tread portion 2 is provided with tread grooves to form a tread pattern.

Figure 1:
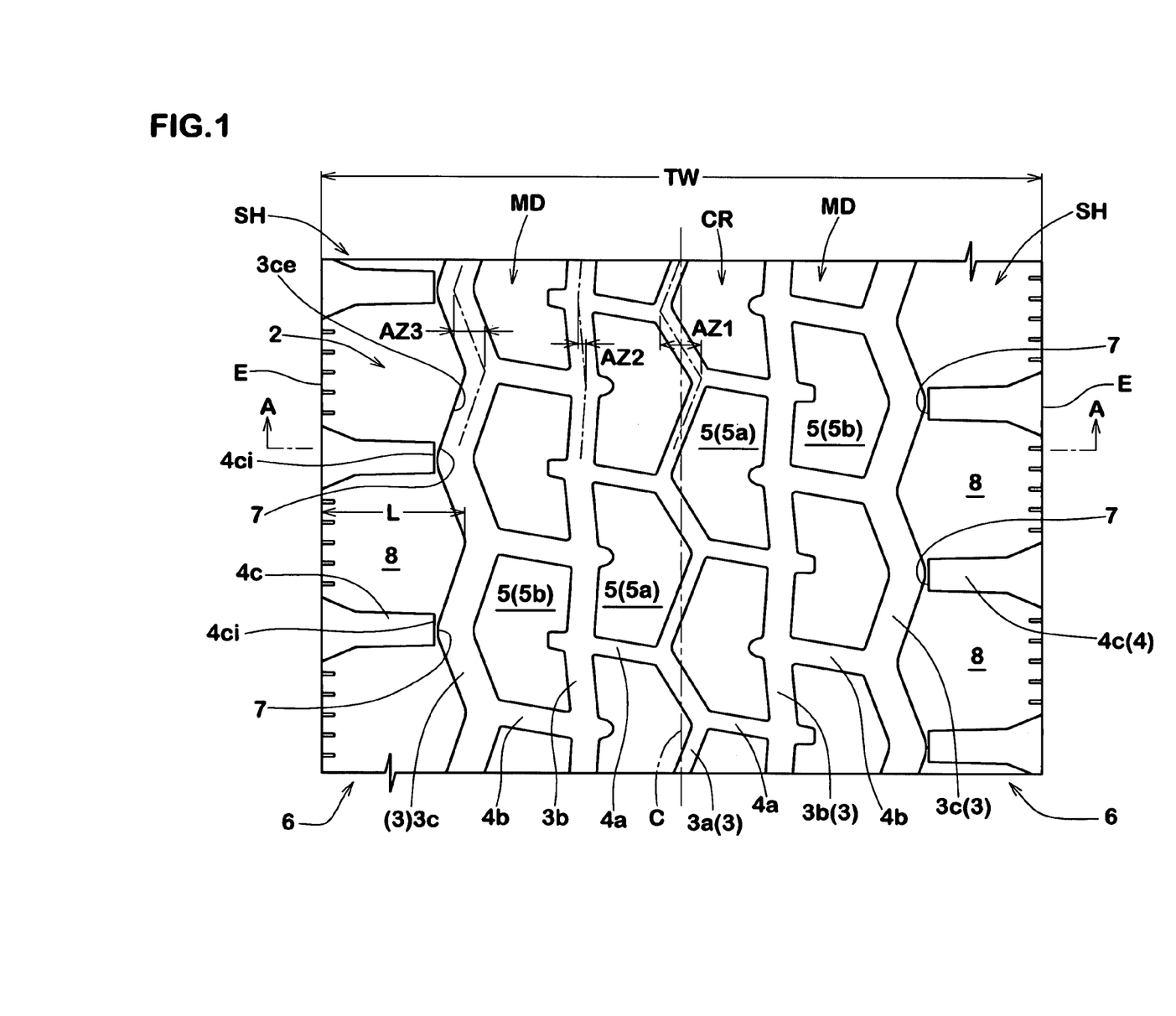
FIG. 1 is a developed view of a tread portion of a pneumatic tire according to the present invention showing a tread pattern.
Figure 2:
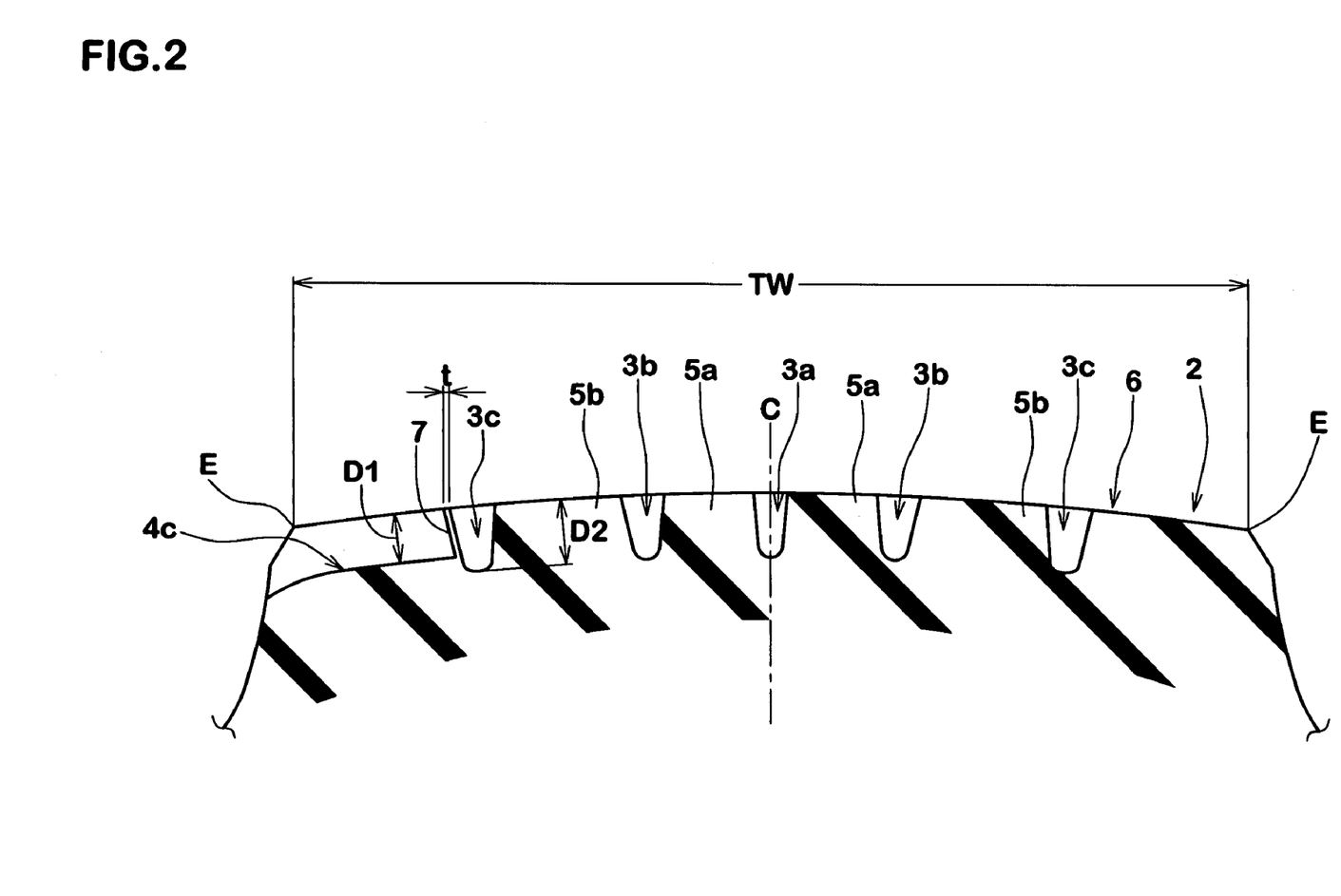
FIG. 2 is a cross sectional view of the tread portion thereof taken along line A-A in FIG. 1.

In the following embodiments, the pneumatic tires are heavy duty radial tires. FIG. 1 shows a block-type tread pattern suitable for heavy duty radial tires for trucks and buses, wherein the tread portion 2 is provided with a plurality of circumferential grooves 3 and a plurality of axial grooves 4.

In FIG. 1, the circumferential grooves 3 are five grooves including: a center circumferential groove 3a extending along the tire equator C; a pair of axially outermost shoulder circumferential grooves 3c; and a pair of middle circumferential grooves 3b each disposed between the center circumferential groove 3a and one of the shoulder circumferential grooves 3c.

The axial grooves 4 include: center axial grooves 4a extending from the middle circumferential grooves 3b to the center circumferential groove 3a; middle axial grooves 4b extending from the middle circumferential grooves 3b to the shoulder circumferential grooves 3c; and shoulder axial grooves 4c extending axially inwardly from each of the tread edges E.

The tread portion 2 is therefore, divided into: crown blocks 5a between the middle circumferential grooves 3b; middle blocks 5b between the middle circumferential grooves 3b and shoulder circumferential grooves 3c; and tread shoulder portions 6 between the shoulder circumferential grooves 3c and tread edges E.

Each of the circumferential grooves 3 (3a, 3b and 3c) extends zigzag in the tire circumferential direction. As to the number of the zigzag pitches, the circumferential grooves 3a, 3b and 3c are equal to each other, but the zigzag amplitude AZ2 of the middle circumferential grooves 3b is smaller than the zigzag amplitude AZ1 of the center circumferential groove 3a and also smaller than the zigzag amplitude AZ3 of the shoulder circumferential grooves 3c.

Thereby, the center blocks 5a, middle block 5b and tread shoulder portions 6 are provided with V-shaped edges capable of improving traction performance while improving drainage performance.

In this example, all the circumferential grooves 3 are zigzag, but some of them, for example middle grooves 3b, may be a straight groove. Further, instead of the zigzag configuration made up of straight segments, a zigzag configuration made up of curved segments like a sinusoidal wave can be employed in at least one of zigzag grooves 3.

In the case of heavy duty tires, preferably the widths of the circumferential grooves 3 are set in a range of not less than 5.0 mm, but not more than 11.0 mm.

If the shoulder circumferential grooves 3c are too far from the tread edges E, it is difficult to provide a good wet performance. Therefore, they are disposed in a specific location such that the maximum axial distance L between the tread edge E and the shoulder circumferential groove 3c, namely, the axial distance L from the tread edge E to the axially innermost end of the axially outside edge 3ce of the shoulder circumferential groove 3c, is set in a range of not less than 12%, preferably more than 14%, more preferably more than 15%, but not more than 26%, preferably less than 24%, more preferably less than 21% of the tread width TW.

If the maximum distance L is less than 12% of on the tread width TW, the rigidity of the tread shoulder portions 6 becomes insufficient, and the steering stability is liable to deteriorate. If more than 26%, it becomes difficult to maintain a sufficient wet performance.

Here, the tread width TW is the axial distance between the tread edges E measured in a normally inflated unloaded condition of the tire.

The tread edges E are the axial outermost edges of the ground contacting region in a normally inflated loaded condition.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

In this example, the above-mentioned center axial grooves $4a$ and middle axial grooves $4b$ are inclined towards the same direction at angles of from 10 to 30 degrees with respect to the tire axial direction. Further, the both ends of each of the axial grooves $4a$, $4b$ are connected to the circumferential grooves 3 at the zigzag peaks (corners) as shown in FIG. 1.

The shoulder axial grooves $4c$ extend in substantially parallel with the tire axial direction, namely, at a smaller angle of from 0 to 5 degrees with respect to the tire axial direction so as to maximize the rigidity in the axial direction of the tread shoulder portions 6 to withstand large side force during cornering.

In order to maintain a large groove volume, the shoulder axial grooves $4c$ are provided with a groove depth D1 in a range of not less than 20%, preferably more than 25% of the groove depth D2 of the shoulder circumferential groove $3c$.

But, if the groove depth D1 is more than 100%, the rigidity of the tread shoulder portions 6 decrease and the steering stability is liable to deteriorated. Therefore, the groove depth D1 is preferably set in a range of not more than 100%, more preferably less than 80% of the groove depth D2.

In the case of heavy duty tires, the groove depth D2 is not less than 15.0 mm, preferably more than 17.0 mm, but not more than 18.5 mm, preferably less than 18.0 mm. The widths of the axial grooves 4 are preferably not less then 5.0 mm but not more than 11.0 mm.

The shoulder axial groove $4c$ is provided with a flare part towards the tread edge E of which groove width gradually increases from a mid point of the groove length to the axially outer end to open to the axially outside of the tire with a wide opening area and thereby to lower the flow speed of the discharged air to reduce the jet sound or discharge noise sound.

The shoulder axial grooves $4c$ are each extended from one of the tread edges E to near the adjacent shoulder circumferential groove $3c$.

But, to prevent a full connection between the axially inner end $4ci$ of the axial groove $4c$ and the circumferential groove $3c$, a partition wall 7 is formed therebetween.

Thus, the above-mentioned tread shoulder portions 6 are in substance divided in the tire circumferential direction, and pseudo-shoulder blocks 8 are formed.

The partition wall 7 is unusually thin as shown in FIG. 1.

The thickness (t) of the partition wall 7 is set in a range of not less than 1%, preferably more than 2%, but not more than 7%, preferably less than 6%, more preferably less than 5% of the above-mentioned maximum axial distance L.

If the thickness (t) is less than 1%, the strength is decreased, and the partition wall 7 is liable to break during running. If more than 7%, wet performance decreases.

Specifically, the thickness (t) is set in a range of less than about 3 mm, preferably about 1 or 2 mm almost independently from the tire size.

The partition wall 7 rises up from the bottom of the shoulder axial groove $4c$, while bridging the adjacent pseudo-shoulder blocks 8.

Figure 3:
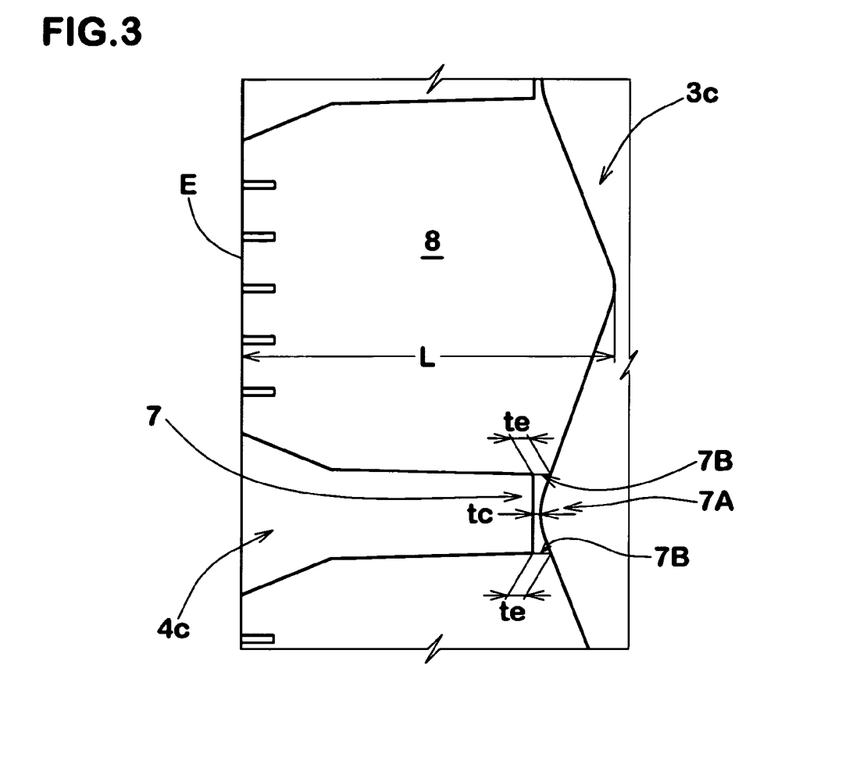
FIG. 3 is an enlarged view showing a part of the tread shoulder portion showing an example of the partition wall.
Figure 4:
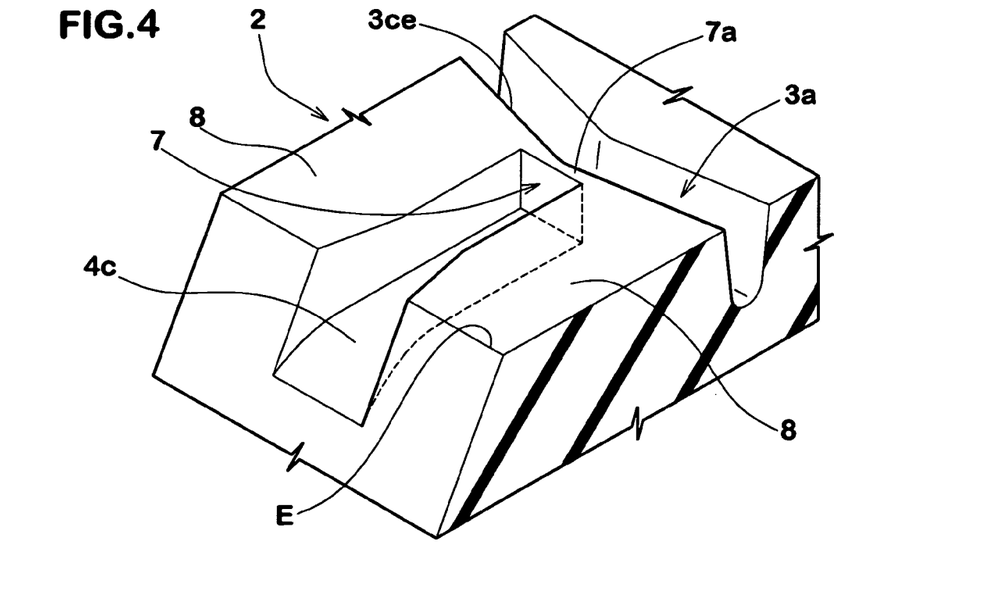
FIG. 4 is a perspective view of the partition wall shown in FIG. 3.

In FIGS. 3 and 4, the partition wall 7 is positioned at the axially inner end $4ci$ of the groove $4c$.

Therefore, the axially inner surface of the partition wall 7 forms a part of the axially outer side wall surface of the shoulder circumferential groove $3c$ which is vent in a form of v-shape, forming an axially outwardly protruding zigzag corner. On the other hand, the axially outer side wall surface ($4ci$) is flat and parallel with the tire circumferential direction. Accordingly, the thickness (t) of the partition wall 7 is gradually increased from the circumferential center 7A to each of the circumferential ends 7B thereof.

During running, opposite side walls between which the partition wall 7 bridges are moved relatively to each other. There is a possibility of concentrating stress on the corners at the junctions of the partition wall 7 and the groove side walls. But, by providing the reduced thickness part in the center of the partition wall 7, the stress concentrates in this thin part rather than the corners, and the occurrence of cracks and breakage starting from the corners are effectively prevented.

In order to achieve this effect without causing breakage in the thin part, the ratio (tc/te) of the minimum thickness tc at the center 7A to the maximum thickness (te) at the ends 7B is preferably set in a range of not less than 0.5, more preferably more than 0.6, but not more than 1.0, more preferably not more than 0.8.

In this example, the partition wall 7 is extended radially outwardly up to the tread surface.

Thus, the radially outer surface $7a$ of the partition wall 7 comes into contact with the road surface during running. Accordingly, the connection between the shoulder axial groove $4c$ and the shoulder circumferential groove $3c$ is fully blocked, and the air compressed within the shoulder circumferential groove $3c$ when located in the ground contacting patch is prevented from being discharged through the shoulder groove $4c$, and accordingly, the so called pumping noise is effectively reduced.

However, even if a gap exists between the radially outer surface $7a$ of the partition wall 7 and the road surface, almost same effect can be obtained as far as the gap is sufficiently small.

Figure 5:
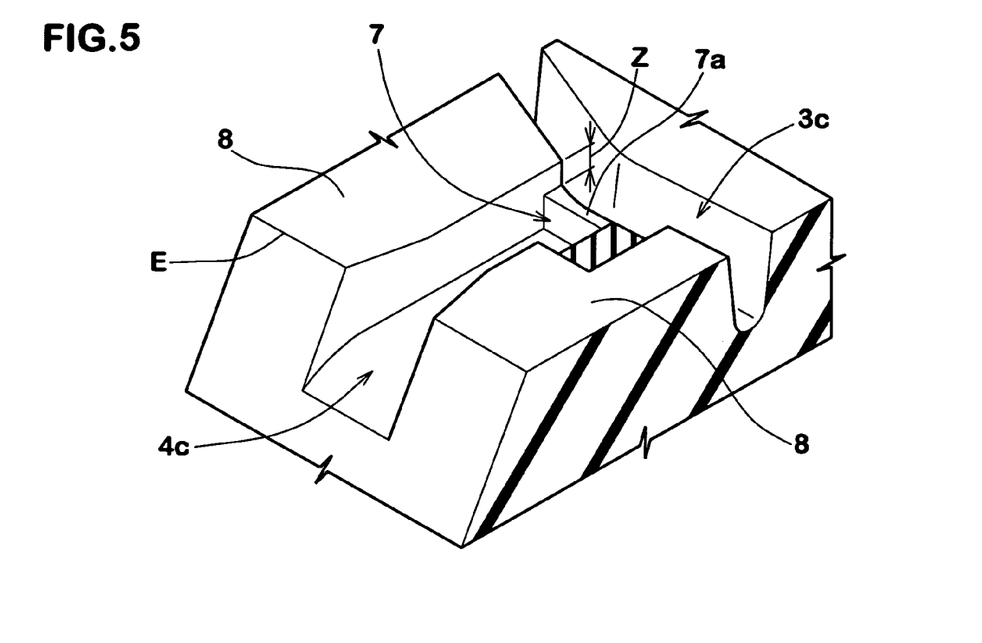
FIG. 5 is a perspective view showing a modification thereof.

FIG. 5 shows a modification of the partition wall 7 show in FIG. 4, wherein the partition wall 7 is terminated at a certain depth (z) from the tread surface. The depth (z) is at most 2 mm, preferably in a range of from about 0.5 mm to about 1.0 mm. Accordingly, the outer surface 7a of the partition wall 7 dose not contact with the road surface, or if contact the contact pressure is greatly decreased. Therefore, damages of the partition wall 7 caused during running in the initial stage of tread wear life can be effectively prevented, while retaining the above-explained blocking effect.

Figure 6:
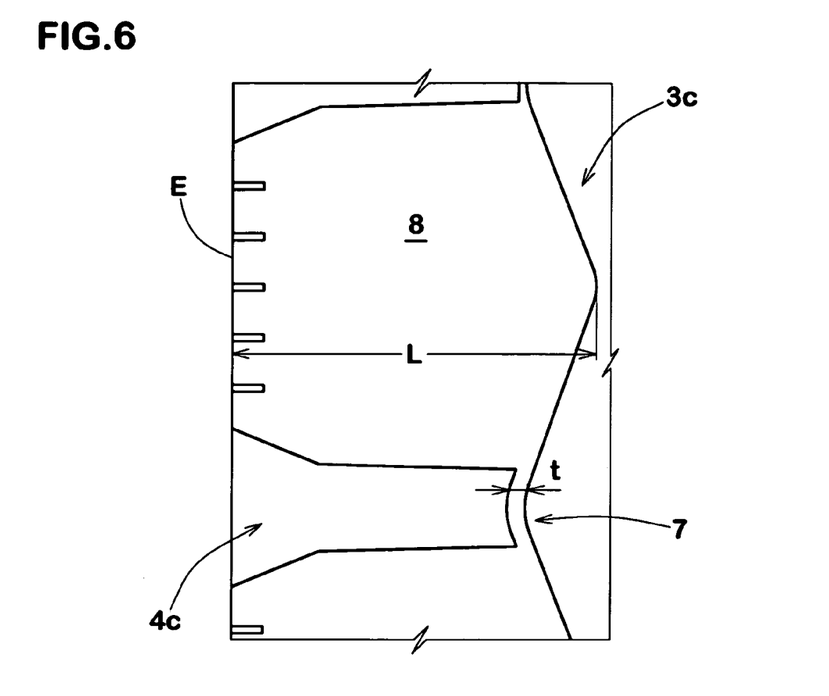
FIG. 6 is an enlarged view showing a part of the tread shoulder portion showing another example of the partition wall.
Figure 7:
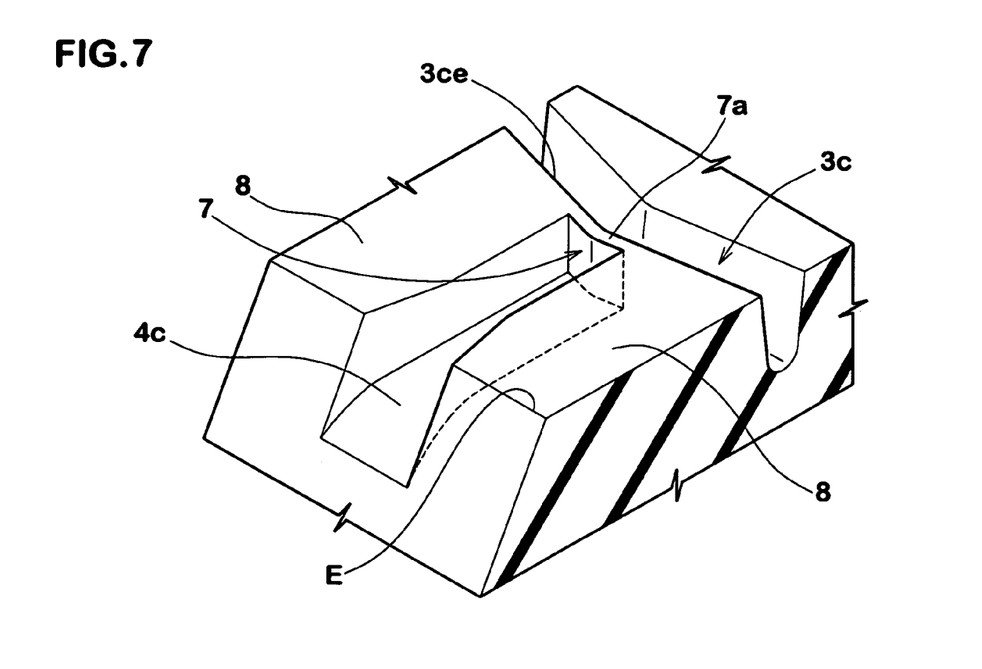
FIG. 7 is a perspective view of the partition wall shown in FIG. 6.

FIGS. 6 and 7 show a further modification of the partition wall 7 show in FIG. 4, wherein the axially outer side wall surface of the partition wall 7 is substantially in parallel with the axially inner side wall surface. Thus, the thickness (t) is substantially constant in the tire circumferential direction. In this example too, the partition wall 7 can be terminated at the depth (z) as explained above.

Figure 8:
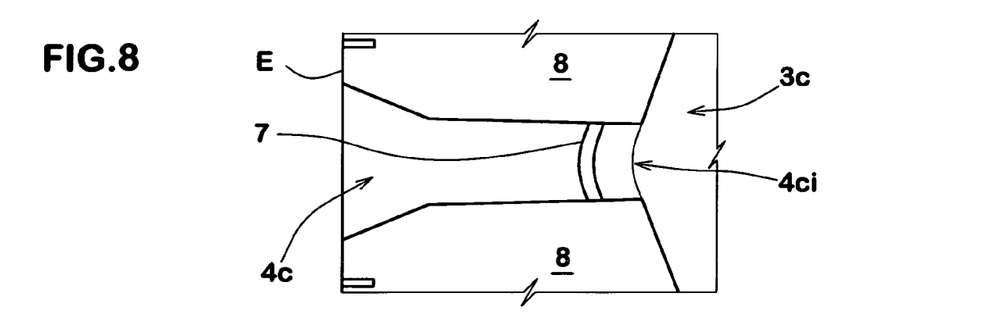
FIGS. 8 and 9 are enlarged views each showing a part of the tread shoulder portion showing still another example of the partition wall.

FIG. 8 shows a modification of the example in FIG. 7, wherein the partition wall 7 is positioned slightly axially outward of the axially inner end 4ci of the groove 4c.

Figure 9:
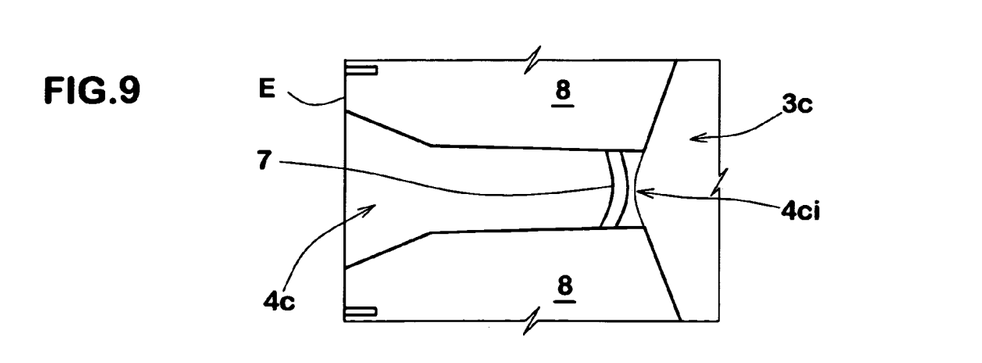

FIG. 9 shows a modification of the example in FIG. 8, wherein the partition wall 7 is reversely vent to protrude axially inwards. This structure can increase the flexural deformation due to a pressure applied thereto from the axially inside. Therefore, the stress at the junction of the partition wall 7 and groove walls may be decreased.

In FIGS. 8 and 9, the partition wall 7 terminates at the depth (Z), but it is also possible to extend up to the tread face.

As shown in FIGS. 7, 8 and 9, by providing such a v-shaped configuration, breakage of the partition wall 7 can be effectively prevented because during running, even if the shoulder blocks 8 are moved and the distance therebetween is increased or decreased, the partition wall 7 can be easily deformed becoming flatter or more sharp V-shape, and accordingly, the stress is reduced. Further, even if the partition wall 7 contacts with road surfaces or objects thereon and deformed thereby, as the partition wall 7 is easily deformed, the breakage can be minimized.

decreases and the durability may be further increased. The axial distance from the groove end 4ci to the partition wall 7 is about 3 mm to 10 mm.

Comparison Tests

Heavy duty radial tires of size 11R22.5 (rim: 7.50×22.5) for trucks and buses were made and tested for durability of the partition walls, wet performance and in-car noise. Except for partition walls, the test tires had the same tread patterns as shown in FIG. 1. The specifications of the tire are shown in Table 1.

Partition Wall Durability Test:

Using a tire test drum having a diameter of 1.7 meters, each test tire mounted on a standard rim and inflated to a standard pressure of 800 kPa was run at a speed of 50 km/h and a tire load of 26.72 kN, and after running for 10000 kilometers, the partition walls were visually checked for cracks. The results are shown in Table 1, wherein "A" indicates that no crack was found, "B" indicates that cracks extending towards the groove bottom but not reached to 50% of the groove depth were observed, and "C" indicates that cracks extending towards the groove bottom over 50% of the groove depth were observed.

Wet Performance Test:

In a tire test circuit, a Japanese 8t truck (2-D wheel type) provided on all the six wheels with test tires (pressure: 800 kPa) was run on a wet asphalt road covered with 5 mm film of water, and the lap time was measured. The results are indicated in Table 1 by an index based on Ref. 1 being 100, wherein the smaller the index number, the better the wet performance.

In-Car Noise Test:

The above-mentioned test truck was coasted on a smooth dry asphalt road at a speed of 50 km/h, and overall noise sound pressure level was measured in the cab, using a microphone fixed at a position near the driver's ear on the outside of the truck. The results are shown in Table 1.

From the test results, it was confirmed that the in-car noise can be remarkably reduced without sacrificing the wet performance.

TABLE 1

Figure 10:
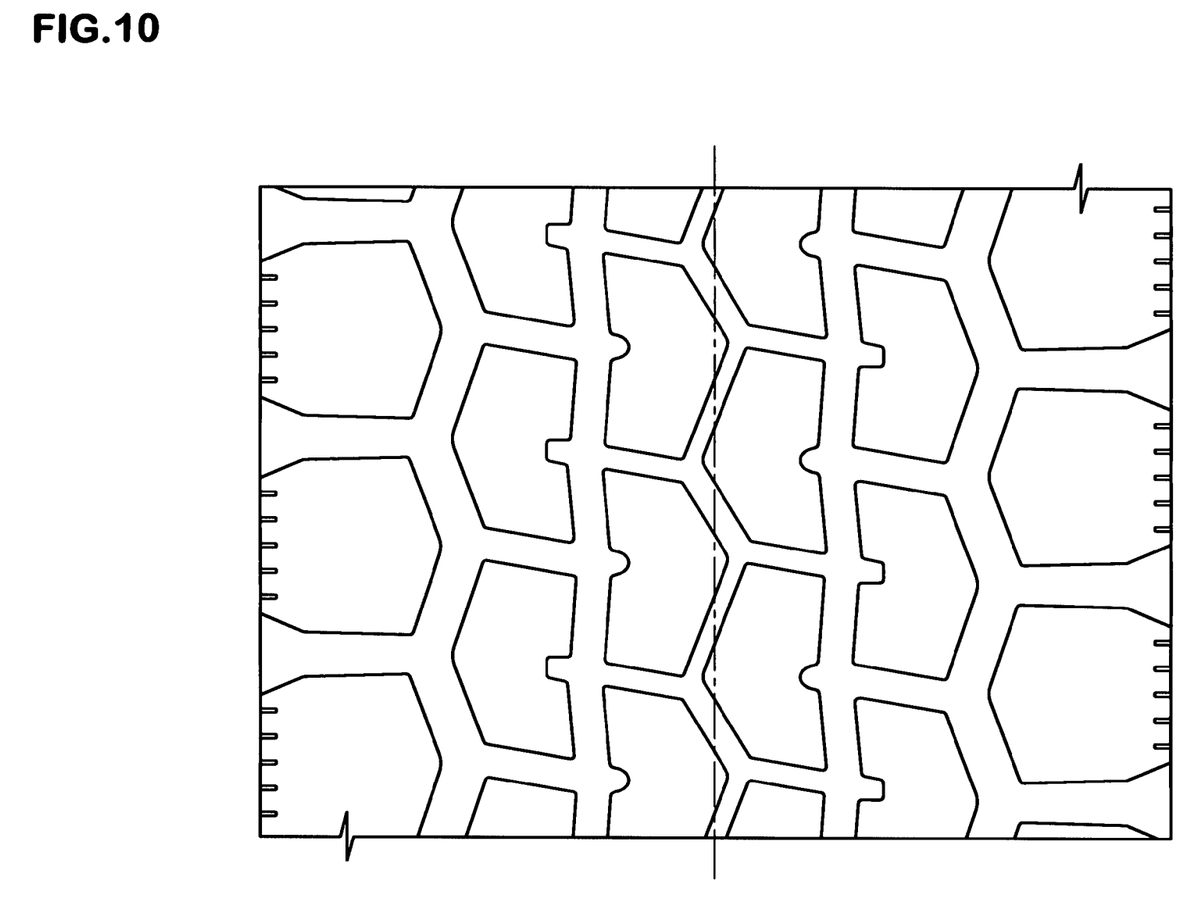
FIG. 10 shows a tread pattern used as a reference in the undermentioned comparison tests.

| Tire | Ref. 1 | Ref. 2 | Ref. 3 | Ref. 4 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| Tread width TW (mm) | 214 | 214 | 214 | 214 | 214 | 214 | 214 | 214 | 214 | 214 | 214 | 214 | 214 |
| Shoulder circumferential groove | | | | | | | | | | | | | |
| Width (mm) | 10.8 | 10.8 | 10.8 | 10.8 | 10.8 | 10.8 | 10.8 | 10.8 | 10.8 | 10.8 | 10.8 | 10.8 | 10.8 |
| Depth D2 (mm) | 16.8 | 16.8 | 16.8 | 16.8 | 16.8 | 16.8 | 16.8 | 16.8 | 16.8 | 16.8 | 16.8 | 16.8 | 16.8 |
| Max. distance L (mm) | 42 | 42 | 42 | 42 | 42 | 42 | 42 | 42 | 42 | 42 | 42 | 42 | 42 |
| L/TW | 0.196 | 0.196 | 0.196 | 0.196 | 0.196 | 0.196 | 0.196 | 0.196 | 0.196 | 0.196 | 0.196 | 0.196 | 0.196 |
| Shoulder axial groove | | | | | | | | | | | | | |
| Width (Max.) (mm) | 17.1 | 17.1 | 17.1 | 17.1 | 17.1 | 17.1 | 17.1 | 17.1 | 17.1 | 17.1 | 17.1 | 17.1 | 17.1 |
| (Min.) (mm) | 9 | 9 | 9 | 9 | 9 | 9 | 9 | 9 | 9 | 9 | 9 | 9 | 9 |
| Depth D1/D2 (%) | 50 | 50 | 50 | 50 | 50 | 50 | 50 | 10 | 50 | 50 | 50 | 50 | 50 |
| Partition wall | FIG. 10 | FIG. 7 | FIG. 7 | FIG. 7 | FIG. 7 | FIG. 7 | FIG. 7 | FIG. 7 | FIG. 4 | FIG. 4 | FIG. 4 | FIG. 7 | FIG. 7 |
| t/L *1 (%) | 0 | 0.5 | 6 | 8 | 2 | 5 | 7 | 2 | 2 | 2 | 2 | 2 | 2 |
| tc/te | — | 1 | 1 | 1 | 1 | 1 | 1 | 1 | 0.9 | 0.5 | 0.3 | 1 | 1 |
| Z (mm) | — | 0 | 0 | 0 | 0 | 0 | 0 | 0 | 0 | 0 | 0 | 1 | 2 |
| Partition wall durability | — | C | A | A | A | A | A | A | A | A | B | A | A |
| Wet performance | 100 | 100 | 98 | 97 | 100 | 100 | 100 | 95 | 100 | 100 | 100 | 100 | 100 |
| In-car noise (dB(A)) | 58.1 | 56.4 | 56.5 | 56 | 56.6 | 56.3 | 56.3 | 54 | 56.3 | 56.6 | 56.4 | 56.5 | 57.6 |

*1 When the thickness t was variable, the minimum is indicated.

As shown in FIGS. 8 and 9, by disposing the partition wall 7 slightly axially outward of the axially inner end 4ci, as the movement of the block becomes smaller when compared with the movement at the corner of shoulder block 8, the stress

The invention claimed is:

1. A pneumatic tire comprising a tread portion provided with axial grooves opened at a tread edge and a circumferential groove adjacent to said tread edge, wherein each said axial groove is provided between said circumferential groove and tread edge with a thin partition wall,
the thickness of the partition wall is in a range of from 2 to 7% of the maximum axial distance between the tread edge and an axially outer edge of the circumferential groove,
the circumferential groove is a zigzag groove having axially outwardly protruding zigzag corners,
said axial grooves each extend from said tread edge to or close to one of said axially outwardly protruding zigzag corners, wherein
the axial groove extends close to said one of the zigzag corners, the partition wall of the axial groove is positioned at the axially inner end of the axial groove,
the axially inner surface of the partition wall is bent in a form of V-shape,
the axially outer surface of the partition wall is substantially in parallel with the axially inner surface of the partition wall so that the partition wall has a substantially constant thickness, or alternatively, is flat so that the partition wall is decreased in the thickness in its central part in the tire circumferential direction and has a minimum thickness in the center part and a maximum thickness at the circumferential ends thereof and the minimum thickness is not less than 0.5 times the maximum thickness, and
the partition wall extends radially outwardly up to the tread surface.

2. The pneumatic tire according to claim 1, wherein the axial grooves each have a depth not more than 100% but not less than 20% of a depth of the circumferential groove.

3. The pneumatic tire according to claim 1, wherein the thickness of the partition wall is less than 3 mm.

4. The pneumatic tire according to claim 1, wherein the tread portion is provided with
a middle circumferential groove, and
middle axial grooves extending axially inwardly from axially inwardly protruding zigzag corners of the circumferential groove to the middle circumferential groove.

* * * * *